United States Patent [19]

Geeck

[11] Patent Number: 4,748,194

[45] Date of Patent: May 31, 1988

[54] PROTECTIVE COATINGS FOR GAS TANK CONTAINERS

[76] Inventor: Thurlow Geeck, 20951 Laurelwood, Farmington, Mich. 48024

[21] Appl. No.: 81,626

[22] Filed: Jul. 24, 1987

Related U.S. Application Data

[63] Continuation of Ser. No. 797,857, Nov. 14, 1985, abandoned.

[51] Int. Cl.$^4$ ............................................. C08L 63/00
[52] U.S. Cl. .................................... 523/427; 523/428; 523/454; 523/457; 523/458; 523/459; 428/418
[58] Field of Search ............... 523/427, 428, 454, 457, 523/458; 525/523, 528, 930

[56] References Cited

U.S. PATENT DOCUMENTS 4,162,244  7/1979  Bertram .............................. 523/459
4,352,899 10/1982  Tada et al. ........................... 523/451
4,476,260 10/1984  Salensky ............................. 523/402

*Primary Examiner*—Theodore E. Pertilla
*Attorney, Agent, or Firm*—Reising, Ethington, Barnard, Perry & Milton

[57] ABSTRACT

A corrosion resistant coating for application to a metal substrate including powdered metal selected from the group consisting essentially of zinc, cadmium, stainless steel, aluminum and alloys and blends thereof; a linear epoxy or phenoxy resin having a molecular weight of less than 15,000 and essentially no highly reactive terminal epoxy group; a cross-linking urethane resin; an active organic solvent selected from the group consisting essentially of acetone, methyl ethyl ketone, methyl isobutyl ketone, dimethylformamide, and blends thereof; and an inactive organic solvent selected from the group consisting essentially of aromatic hydrocarbons, alcohols, and blends thereof.

22 Claims, No Drawings

PROTECTIVE COATINGS FOR GAS TANK CONTAINERS

This application is a continuation of application Ser. No. 797,857, filed Nov. 14, 1985, now abandoned.

TECHNICAL FIELD

This invention relates to coatings for metal substrates and, more particularly, to coatings for protecting a metal substrate from corrosion. The instant invention finds particular use as coatings for the exterior and interior of a gas tank.

BACKGROUND ART

Protective coatings for gas tank containers are subjected to external and environmental abuse as well as internal solvent degradation. Externally, a gas tank must endure abrasion from gravel and other road debris as well salt degradation. Accordingly, the exterior coating is generally a zinc containing compound having a relatively hard surface. Although such a surface must be adaptive to welding and/or soldering additives, prior art coatings tended to decrease weldability.

Prior art resin coatings, such as the coatings disclosed in the U.S. Pat. No. 4,391,855 to Geeck issued July 5, 1983 are resin coatings including cross-linking agents. A secondary resin is added, such as a melamine formaldehyde type cross-linker. Such cross-linking agents required extended periods of time for cure. Longer term baking or air drying is required. While the use of lower molecular weight resins alone provide good adhesion to the metal substrate and good formability, such resins alone are too soft for exterior gas tank protection.

Gas tanks generally have a lead and tin plate on the surface. Such surfaces are hard to coat, making adhesion another critical factor in formulating a corrosion resistant coating. As previously stated, lower molecular weight resins alone provide good adhesion to metal substrates and good formability but are too soft for exterior gas tank protection. At the other extreme, high molecular weight resins do not provide sufficient adhesion and do not provide sufficient formability.

The interior of a gas tank does not require the same protective characteristics as the exterior of the gas tank. However, corrosion resistance, formability, and adhesion still remain critical factors. Lower molecular weight resins provide good adhesion and formability. However, the interior of the tank is exposed to unleaded gasoline and/or other fuel and gasoline additives. Solvents such as these attack the lower molecular weight resin surface causing swelling and leaching of the lead from the metal substrate. Leaching results in contamination and eventual failure of engine components.

SUMMARY OF THE INVENTION

The instant invention provides a corrosion resistant coating for application to a metal substrate, the coating including powdered metal selected from the group consisting essentially of zinc, cadmium, stainless steel, aluminum and alloys and blends thereof and a linear epoxy or phenoxy resin having a molecular weight of less than 15,000 and essentially no highly reactive terminal epoxy groups. A cross-linking urethane resin is included. An active organic solvent is selected from the group consisting essentially of acetone, methyl ethyl ketone, methyl isobutyl ketone, dimethylformamide, and blends thereof. An inactive organic solvent is selected from the group consisting essentially of an aromatic hydrocarbon, alcohols, and blends thereof.

The coating may include additional materials. The coating includes a cross-linking urethane resin for providing hardness to the resin system while preventing leaching by fuels. The coating may include an additional higher molecular weight linear epoxy resin having a molecular weight greater than 15,000 for providing hardness to the resin system especially suitable for the exterior of a gas tank. The resin system may also include a welding enhancer for enhancing the weldability of the cured coating.

The instant invention further provides a method of making the corrosion resistant coating including the steps of mixing together the powdered metal, the linear epoxy or phenoxy resin having a molecular weight of less than 15,000, and either of or a combination of the cross-linking urethane resin, the higher molecular weight resin, and/or the welding enhancer. The mixture is milled to produce a substantially homogenious mixture having a Hegman grind rating in the range of 4 to 7H. The mixture is then blended with an active organic solvent and an inactive organic solvent.

DETAILED DESCRIPTION OF THE INVENTION

The corrosion resistant coating for application to a metal substrate includes a powdered metal selected from the group consisting essentially of zinc, cadmium, stainless steel, aluminum, and alloys and blends thereof. The metal is a preferably a finely powdered metal. Preferably, the metal has an average particle size not greater than about 40 microns with a maximum individual particle size of not more than 100 microns. The powdered metal is commercially available. Powdered zinc and cadmium may be purchased from the Federated Metals Division of American Smelting and Refining Company. Powdered stainless steel can be purchased from U.S. Bronze Powders, Inc. Powdered aluminum can be purchased from Reynolds Metals Company. For an exterior coating, zinc is preferred because of its rust inhibiting characteristics. Interior coatings preferably contain aluminum or stainless steel.

A linear epoxy of phenoxy resin is added to provide a bonding material. The linear epoxy or phenoxy resin has a molecular weight of less than 15,000 and essentially no highly reactive terminal epoxy groups. Suitable commercially available linear epoxy and phenoxy resins are Araldite 45-E-50, 488-E-32, and 488-N-40 epoxy resins sold by Ciba-Geigy Corporation. Such resins have excellent adhesion characteristics.

A cross-linking urethane resin is added to the resin system. The cross-linking urethane resin is selected from the group consisting of a ketoxime blocked polyisocyanate, a blocked aliphatic polyisocyanate (isophorone diisocyanate), a blocked aromatic isocyanate prepolymer based on toluene diisocyanate. Suitable urethane cross-linkers available from Mobay Chemical Company are Mondur HCB, Desmodur KL5-2544, Desmodur BL 1260, and Desmodur KL5-2371. The system may include 0.40 to 3.00 parts per 100 by weight of the cross-linking urethane resin.

The resin system may include in combination with the urethane resin or alone, an additional higher molecular weight linear phenoxy resin having a molecular weight greater than 15,000. Suitable higher molecular weight resins available from Union Carbide Corporation are PKHH, PKHC and PKHJ resins. PKHH resin has a solution viscosity of 4500 to 7000 cP. PKHC has a solution viscosity of 3200 to 4500 cP. PKHA has a solution viscosity of 2000 to 3200 cP. All viscosity determinations are made as 40% total solids methyl ethyl ketone solvent. PKHH has an average molecular weight of 30,000, PKHC has an average molecular weight 25,000, and PKHJ has an average molecular weight of 35,000.

Additionally, the coating may have alone or in combination with the urethane resin and/or the higher molecular weight phenoxy resin, a welding enhancer. The welding enhancer enhances the weldability of the cured coating. This overcomes the effect of other additives which decrease the weldability of the coating. Preferably, the welding enhancer is di-Ferro-phosphide. The coating may contain 2.70 to 22 parts per 100 by weight of the welding enhancer.

The coating includes an active organic solvent selected from the group consisting essentially of actone, methyl ethyl ketone, methyl isobutyl ketone, dimethyl-formamide, and blends thereof. The system also includes an inactive organic solvent selected from the group consisting essentially of aromatic hydrocarbons, alcohols, and blends thereof. Suitable commercially available aromatic hydrocarbon solvents are available from Exxon Corporation as SC 100 and SC 150. Inactive solvents decrease the cost of the vehicle and are believed to improve the adhesion and salt spray corrosion resistance of the coating. The vehicle may consist of about 10% to 40%, and more preferably 25% to 35% by weight of inactive solvents, the balance being essentially active solvents. The addition of such solvents produce desired the viscosity of the desired product for the particular method of applying the composition to a substrate. Dipping, rolling, or spraying may require different desirable viscosity characteristics.

A suspension agent is added to the coating for suspending the powdered metal. The suspension agent ensures that the powdered metal does not settle out of the coating composition to form a hard cake. A suitable suspension agent is polyethylene. Polyethylene may be purchased from Baker Castor Oil Company as MPA-60X. The polyethylene may be purchased from Matteson-Rudolfi, Inc. as MRT-1. MPA-60X is essentially one part polyethylene and three part xylene by weight. MRT-1 is also essentially one part polyethylene and three parts xylene by weight. The coating may include 2.5 to 5 parts per hundred by weight of the suspension agent.

A thixotropic agent is added to the coating to ensure that the composition does not gel prior to being cured by the application of heat and to produce a thin coating on the substrate with the powdered metal uniformly distributed therein. A preferable thixotropic agent is silane treated silica dioxide which is believed to also improve the salt spray corrosion resistance of the coating. Tulco Corporation commercially provides Tullanox 292 and 500; Cabot, Inc. distributes Cabosil M-5, and DeGussa Corporation distributes R-972. The coating may include 0.90 to 2.00 parts per 100 by weight of the thixotropic agent.

The coating includes a hygroscopic agent for scavengering water in the coating. The hygroscopic agent is selected from the group consisting essentially of calcium oxide, silica dioxide, barium oxide, and potassium chloride. An excess amount of hygroscopic material is believed to decrease the corrosion resistance of the coating. Neutralization of the acidity of the linear epoxy or phenoxy resin is not required in the system.

The lower weight linear epoxy or phenoxy resin having a molecular weight of less than 15,000 and essentially no highly reactive terminally epoxy groups provides excellent adhesion properties to either the inside or outside gas tank coating. The higher molecular weight phenoxy resin is added to the resin system to harden the system while having good adhesion properties in combination with the lower molecular weight resin. Such a combination of resins is used preferably as an outside tank coating. The addition of the cross-linking resin provides hardening of the inside tank coating while preventing leaching of lead from the substrate metal by fuels contained within the gas tank. The amount of either the higher molecular weight phenoxy resin or the cross-linking urethane resin is minimized to allow for sufficient formability of the metal. A welding enhancer is provided for increasing the weldability of the metal. Hence, the instant invention provides improved adhesion, corrosion resistance, the weldability, all in balance. Such a coating as made in accordance with the instant invention does not have the temperature setting problems of prior art coatings including phenoxy or melamine-formaldehyde cross-linking resins.

The instant invention provides a method of making the corrosion resistant coating for application to and curing on a metal substrate. The method includes the steps of mixing together the powdered metal, the lower weight linear epoxy or phenoxy resin, and either or all of the cross-linking urethane resin, the higher molecular weight phenoxy resin, and the welding enhancer. The materials are added to a vessel under agitation using a high speed Cowles Dissolver. The materials are mixed at a high speed of between 800 to 1450 RPM until as the temperature reaches from 130° to 150° F. The mixture is then milled to produce a substantially homogeneous mixture having a Hegman grind rating in the range of 4-7H. The active and inactive organic solvents are added to the mixture, preferably after the temperature of the mixture has been reduced to 80° F.

The following examples of compositions are illustrative of this invention and are not intended to limit the scope of the invention as defined by the appended claims.

EXAMPLE I

Zinc Rich

The following items were added in the order listed to a vessel under agitation using a high speed Cowles Dissolver.

| Parts by Weight | Material |
|---|---|
| 311.20 | Linear epoxy or phenoxy resin (488-E-32, Ciba Geigy Corp.) with 32% solids by weight in Cellosolve ™ (Trademark of Union Carbide Corp. for ethylene glycol monobutyl ether acetate) acetate. |
| 25.60 | Suspension agent (MPA-60X Baker Castor Oil Co.). |
| 10.16 | Thixotropic agent (Tullanox 500, Tulco Corp. |
| 519.60 | Zinc Powder (#530 Zinc dust, St. Joseph Resource Co.). |
| 27.35 | Ferrophosphate HRS 2132 (Welding enhancer - Hooker Chem. Co. |

These materials were mixed at a speed of about 1000 RPM with a Cowels High Speed Dissolver until the mixture was heated to a temperature of about 140° F. The heated mixture was then pumped into a sandmill and milled to produce a homogeneous mixture having a Hegman particle size grind rating of 6H. Thereafter, the homogeneous mixture was blended with the following materials to produce the completed composition.

| Parts by Weight | Material |
|---|---|
| 88.59 | Methyl ethyl Ketone Solvent. |
| 17.50 | SC 150 Aromatic Hydrocarbon Solvent. |
| 1000.00 | |

EXAMPLE II

Zinc Rich

The following items were added in the order listed to a vessel under agitation using a high speed Cowles Dissolver.

| Parts by Weight | Material |
|---|---|
| 311.20 | Linear epoxy or phenoxy resin (488-E-32, Ciba Geigy Corp.) with 32% solids by weight in Cellosolve TM acetate. |
| 25.60 | Suspension agent (MPA-60X Baker Castor Oil Co.). |
| 10.16 | Thixotropic agent (Tullanox 500, Tulco Corp. |
| 328.17 | Zinc Powder (#560 Zinc dust, St. Joseph Resource Co.). |
| 218.78 | Welding Enhancer - Ferrophosphate CRS 2132 - Hooker Chem. Co. |

These materials were mixed at a speed of about 900 RPM with a Cowels High Speed Dissolver until the mixture was heated to a temperature of about 150° F. The heated mixture was then pumped into a sandmill and milled to produce a homogeneous mixture having a Hegman particle size grind rating of 7H. Thereafter, the homogeneous mixture was blended with the following materials to produce the completed composition.

| Parts by Weight | Material |
|---|---|
| 88.59 | Methyl Ethyl Ketone Solvent: |
| 17.50 | Sc 150 Aromatic Hydrocarbon Solvent. |
| 1000.00 | |

EXAMPLE III

Charcoal Zinc Rich

The following materials were added in the order listed to a vessel under agitation using a high speed Cowles Dissolver.

| Parts by Weight | Material |
|---|---|
| 311.20 | Linear epoxy or phenoxy resin (488-E-32, Ciba Geigy Corp.) with 32% solids by weight in Cellosolve TM acetate. |
| 25.60 | Suspension agent (MPA-60X Baker Castor Oil Co.). |
| 10.16 | Thixotropic agent (Tullanox 500, Tulco Corp. |
| 399.60 | Zinc Powder (#10 Zinc Dust, Federated Metals). |
| 27.35 | Welding Enhancer - Ferrophosphate HRS 2132 - Hooker Chem. Co. |
| 120.00 | Black Iron Oxide - #303T - Mobay Chem. Co. |

These materials were mixed at a speed of about 800 RPM with a Cowels High Speed Dissolver until the mixture was heated to a temperature of about 150° F. The heated mixture was then pumped into a sandmill and milled to produce a homogeneous mixture having a Hegman particle size grind rating of 7H. Thereafter, the homogeneous mixture was blended with the following materials to produce the completed composition.

| Parts by Weight | Material |
|---|---|
| 88.59 | Solvent - Methyl Ethyl Ketone |
| 17.50 | Solvent - SC 150 Aromatic Hydrocarbon |
| 1000.00 | |

EXAMPLE IV

Zinc Rich

The following materials were added in the order listed to a vessel under agitation using a high speed Cowles Dissolver.

| Parts by Weight | Material |
|---|---|
| 174.27 | Linear epoxy or phenoxy resin (488-N-40, Ciba Geigy Corp.) with 40% solids by weight in methyl ethyl ketone solvent. |
| 119.50 | Linear epoxy or phenoxy resin (565 epoxy resin, Celanese Corp.) with 25% solids by weight in methyl ethyl ketone solvent. |
| 47.46 | Suspension agent (N-11 polyethylene, Eastman Chemical Corp.) with 13% solids by weight in xylene. |
| 5.00 | Hygroscopic agent (Syloid ZN-1 Davidson Chem. Co.) |
| 8.22 | Thixotropic agent (Cabosil M-5 Cabot Corp.) |
| 430.00 | Zinc powder (L-15 Zinc Dust, Federated Metals). |
| 27.00 | Welding Enhancer - HRS 2132 Ferrophosphate, (Hooker Chemical Co.) |

These materials were mixed at a speed of about 1450 RPM with a Cowels High Speed Dissolver until the mixture was heated to a temperature of about 135° F. The heated mixture was then pumped into a sandmill and milled to produce a homogeneous mixture having a Hegman particle size grind rating of 5.0H. Thereafter, the homogeneous mixture was blended with the following materials to produce the completed composition.

| Parts by Weight | Material |
|---|---|
| 188.55 | Solvent - Ektasolve PM acetate, Eastman Chem. Co. (Propyl glycol mono ethyl ether acetate. |
| 1000.00 | |

EXAMPLE V

Zinc Rich

The following materials were added in the order listed to a vessel under agitation using a high speed Cowles Dissolver.

| Parts by Weight | Material |
|---|---|
| 250.00 | Linear epoxy or phenoxy resin (488-N-40, Epoxy - Ciba Geigy Corp.) with 40% solids by weight in methyl ethyl ketone solvent. |
| 30.00 | Suspension agent (MPA-60X Baker Castor Oil Co.). |
| 11.15 | Thixotropic agent (Tullanox 500, Tulco Corp. |
| 525.00 | Zinc Powder (#530 Zinc dust, St. Joseph Resource Co.). |
| 50.00 | Welding Enhancer - Ferrophosphate HRS 2132 - Hooker Chem. Co. |

These materials were mixed at a speed of about 1350 RPM with a Cowels High Speed Dissolver until the mixture was heated to a temperature of about 140° F. The heated mixture was then pumped into a sandmill and milled to produce a homogeneous mixture having a Hegman particle size grind rating of 6H. Thereafter, the homogeneous mixture was blended with the following materials to produce the completed composition.

| Parts by Weight | Material |
|---|---|
| 35.00 | Solvent - Xylene |
| 98.85 | Solvent - Ektasolve PM Acetate, Eastman Chemical Co. (propyl glycol mono ethyl ether acetate) |
| 1000.00 | |

EXAMPLE VI

Zinc Rich

The following materials were added in the order listed to a vessel under agitation using a high speed Cowles Dissolver.

| Parts by Weight | Material |
|---|---|
| 250.00 | Linear epoxy or phenoxy resin (488-E-40 Epoxy, Ciba Geigy Corp.) with 32% solids by weight in methyl ethyl ketone solvent. |
| 30.00 | Suspension agent (MPA-60X Baker Castor Oil Co.). |
| 10.20 | Thixotropic agent (Tullanox 500, Tulco Corp. |
| 615.00 | Zinc Powder (#530 Zinc dust, St. Joseph Resource Co.). |
| 50.00 | Welding Enhancer - Ferrophosphate HRS 2132 - Hooker Chem. Co. |

These materials were mixed at a speed of about 1420 RPM in a Cowels High Speed Dissolver until the mixture was heated to a temperature of about 145° F. The heated mixture was then pumped into a sandmill and milled to produce a homogeneous mixture having a Hegman particle size grind rating of 7H. Thereafter, the homogeneous mixture was blended with the following materials to produce the completed composition.

| Parts by Weight | Material |
|---|---|
| 44.80 | Solvent - Cello Solvent Acetate (Union Carbide Corp.) |
| 1000.00 | |

EXAMPLE VII

Aluminum Coating

The following materials were added in the order listed to a vessel under agitation using a high speed Cowles Dissolver.

| Parts by Weight | Material |
|---|---|
| 414.00 | Linear epoxy or phenoxy resin (488-N-40, Epoxy - Ciba Geigy Corp.) with 40% solids by weight in methyl ethyl ketone. |
| 184.00 | Linear epoxy or phenoxy resin (PKHH phenoxy - Union Carbide Corp.) with 30% solids by weight in methyl ethyl ketone. |
| 9.50 | Thixotropic agent (Tullanox 500, Tulco Corp. |
| 130.00 | Aluminum Powder (A non-leafing Grade as a stain resistant paste - #8-232, Reynolds Metal Co. - 65% solids by weight in mineral spirits). |

These materials were mixed at a speed of about 1300 RPM with a Cowels High Speed Dissolver until the mixture was heated to a temperature of about 149° F. The heated mixture was then pumped into a sandmill and milled to produce a homogeneous mixture having a Hegman particle size grind rating of 5.0H. Thereafter, the homogeneous mixture was blended with the following materials to produce the completed composition.

| Parts by Weight | Material |
|---|---|
| 60.00 | Methyl ethyl ketone |
| 50.00 | Xylene |
| 128.00 | Cellosolve Acetate. |
| 1000.00 | |

EXAMPLE VIII

Aluminum Rich

The following materials were added in the order listed to a vessel under agitation using a high speed Cowles Dissolver.

| Parts by Weight | Material |
|---|---|
| 569.00 | Linear epoxy or phenoxy resin (488-N-40 Epoxy, Ciba Geigy Corp.) with 40% solids by weight in methyl ethyl ketone. |
| 20.00 | Suspension agent (Polyetheylene, MPA-60X Baker Castor Oil Co.). |
| 14.00 | Thixotropic agent (Tullanox 500, Tulco Corp. |
| 150.00 | Aluminum Powder (a non-leafing Grade as a stain resistant paste - #8-232, Reynolds Metal Co. - 65% solids by weight in mineral spirits). |

These materials were mixed at a speed of about 1175 RPM with a Cowels High Speed Dissolver until the mixture was heated to a temperature of about 137° F. The heated mixture was then pumped into a sandmill and milled to produce a homogeneous mixture having a Hegman particle size grind rating of 4H. Thereafter, the homogeneous mixture was reduced in temperature to 80° F. and the following materials were added to produce the completed composition.

| Parts by Weight | Material |
| --- | --- |
| 60.00 | Mondur HCB, Mobay Chemical Co. (58% solids by weight - a Ketoxime blocked polyisocyanate). The HCB resin is added 50% by weight into a solution of 50% propylene glycol mono methyl ether acetate. |
| 187.00 | Propylene glycol mono methyl ether acetate. |
| 1000.00 | |

EXAMPLE IX

Aluminum Rich

The following materials were added in the order listed to a vessel under agitation using a high speed Cowles Dissolver.

| Parts by Weight | Material |
| --- | --- |
| 385.00 | Linear epoxy or phenoxy resin (488-N-40 Epoxy, Ciba Geigy Corp.) with 40% solids by weight in Methyl Ethyl Ketone |
| 171.00 | Linear epoxy or phenoxy resin (PKHH Phenoxy - Union Carbice Corp.) with 30% solids by weight in Methyl Ethyl Ketone. |
| 24.00 | Suspension agent (Polyetheylene, MPA-60X Baker Castor Oil Co.). |
| 10.20 | Thixotropic agent (Tullanox 500, Tulco Corp. |
| 140.00 | Aluminum Powder (a non-leafing Grade as a stain resistant paste - #8-232, Reynolds Metal Co. - 65% solids by weight in mineral spirits). |

These materials were mixed at a speed of about 1200 RPM with a Cowels High Speed Dissolver until the mixture was heated to a temperature of about 142° F. The heated mixture was then pumped into a sandmill and milled to produce a homogeneous mixture having a Hegman particle size grind rating of 5H. Thereafter, the homogeneous mixture was reduced in temperature to 80° F. and the following materials were added to produce the completed composition.

| Parts by Weight | Material |
| --- | --- |
| 40.00 | Mondur HCB, Mobay Chemical Co. (58% solids by weight - a Ketoxime blocked polyisocyanate). The HCB resin is added 50% by wieght into a solution of 50% propylene glycol mono methyl ether acetate. |
| 128.00 | Cellosolve Acetate |
| 50.00 | Xylene |
| 51.80 | Propylene glycol mono methyl ether acetate. |
| 1000.00 | |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A corrosion resistant coating for application to a metal substrate, said coating consisting essentially of: 13 to 52 parts per hundred of a powdered metal selected from the group consisting essentially of zinc, cadmium, stainless steel, aluminum, and alloys and blends thereof; 17.4 to 56.9 parts per hundred of a linear epoxy or phenoxy resin having an average molecular weight of less than 15,000 as determined by calculation from epoxy equivalent weight and essentially no highly reactive terminal epoxy groups; and 0.4 to 3.0 parts per hundred of a cross-linking urethane resin; the balance of said coating consisting essentially of an active organic solvent selected from the groups consisting essentially of acetone, methyl ethyl ketone, methyl isobutyl ketone, dimethylformamide, and blends thereof; and an inactive organic solvent selected from the groups consisting essentially of aromatic hydrocarbons, alcohols, and blends thereof.

2. A coating as set forth in claim 1 wherein said cross-linking urethane resin is selected from the group consisting of a ketoxime blocked polyisocyanate, blocked aliphatic polyisocyanate, and blocked aromatic isocyanate prepolymer.

3. A coating as set forth in claim 1 including a suspension agent for suspending said powdered metal.

4. A coating as set forth in claim 3 wherein said suspension agent includes polyethylene.

5. A coating as set forth in claim 3 including 2.5 to 5 parts per hundred by weight of said suspension agent.

6. A coating as set forth in claim 1 including a thixotropic agent for preventing gelling prior to heat care for producing a thin uniform distribution on the metal substrate.

7. A coating as set forth in claim 6 wherein said thixotropic agent is a silane treated silica dioxide thixotropic agent.

8. A coating as set forth in claim 6 including 0.90 to 2.00 parts per hundred by weight of said thixotropic agent.

9. A coating as set forth in claim 1 including a welding enhancer for enhancing the weldability of the cured coating.

10. A coating as set forth in claim 9 wherein said welding enhancer is a di-ferrophosphate.

11. A coating as set forth in claim 9 including 2.70 to 22.00 parts per hundred by weight of said welding enhancer.

12. A coating as set forth in claim 1 including an additional higher molecular weight linear phenoxy having a molecular weight greater than 15,000.

13. A coating as set forth in claim 12 including 0.4 to 40 parts by weight of said higher molecular weight linear phenoxy resin.

14. A coating as set forth in claim 1 including a hygroscopic agent for scavengering water in said coating.

15. A coating as set forth in claim 14 wherein said hygroscopic agent is selected from the group consisting essentially calcium oxide, silica dioxide, barium oxide, and potassium chloride.

16. A corrosion resistant coating for application to a metal substrate, said coating comprising: 13 to 52 parts per hundred of a powdered metal selected from the group consisting essentially of zinc cadmium, stainless steel, aluminum, and alloys and blends thereof; 17.4 to 56.9 parts per hundred of a linear epoxy or phenoxy resin having an average molecular weight of less than 15,000 as determined by calculation from epoxy equivalent weight and essentially no highly reactive terminal epoxy groups; and 2.7 to 22 parts per hundred of a welding enhancer for enhancing the weldability, and the balance of said coating consisting essentially of an active organic solvent selected from the group consisting essentially of acetone, methyl ethyl ketone, methyl isobutyl ketone, dimethylformamide.

17. A coating as set forth in claim 10 including 2.70 to 22.00 parts per hundred by weight of said welding enhancer.

18. A coating as set forth in claim 11 including an additional higher molecular weight linear epoxy resin having a molecular weight greater than 15,000.

19. A coating as set forth in claim 16 including an additional higher molecular weight linear phenoxy resin having a molecular weight greater than 15,000.

20. A coating as set forth in claim 19 including 0.4 to 40 parts by weight of said higher molecular weight linear phenoxy resin.

21. A corrosion resistant coating for application to a metal substrate, said coating comprising: 13 to 52 parts per hundred of a powdered metal selected from the group consisting essentially of zinc, cadmium, stainless steel, aluminum, and alloys and blends thereof; 17.4 to 56.9 parts per hundred of a linear epoxy or phenoxy resin having an average molecular weight of less than 15,000 as determined by calculation from epoxy equivalent weight and essentially no highly reactive terminal epoxy groups; 17.1 to 40 parts per hundred of an additional higher molecular weight linear phenoxy resin having a molecular weight greater than 15,000; and the balance of the coating essentially consisting of an active organic solvent selected from the group consisting essentially of acetone, methyl ethyl ketone, methyl isobutyl ketone, dimethylformamide, and blends thereof; and an inactive organic solvent selected from the group consisting essentially of aromatic hydrocarbons, alcohols, and blends thereof.

22. A coating as set forth in claim 11 including 0.4 to 40 parts by weight of said higher molecular weight linear phenoxy resin.

* * * * *